(12) United States Patent
Su et al.

(10) Patent No.: US 10,969,780 B2
(45) Date of Patent: Apr. 6, 2021

(54) DELIVERY METHOD AND DELIVERY CONTROL DEVICE

(71) Applicant: BOE TECHNOLOGY GROUP CO., LTD., Beijing (CN)

(72) Inventors: Haijun Su, Beijing (CN); Yue Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/599,983

(22) Filed: Oct. 11, 2019

(65) Prior Publication Data

US 2020/0050187 A1 Feb. 13, 2020

Related U.S. Application Data

(62) Division of application No. 15/813,659, filed on Nov. 15, 2017, now Pat. No. 10,481,601.

(30) Foreign Application Priority Data

Nov. 16, 2016 (CN) .......................... 201611034249.X

(51) Int. Cl.
 *G05D 1/00* (2006.01)
 *G05D 1/02* (2020.01)
 (Continued)

(52) U.S. Cl.
 CPC ......... *G05D 1/0027* (2013.01); *B64C 39/024* (2013.01); *G01C 21/3453* (2013.01);
 (Continued)

(58) Field of Classification Search
 CPC .... G05D 1/0027; G05D 1/101; G05D 1/0291; G01C 21/3453; B64C 39/024;
 (Continued)

(56) References Cited

U.S. PATENT DOCUMENTS

2015/0370251 A1\* 12/2015 Siegel .................... B64D 1/22
 701/2
2019/0166765 A1 6/2019 Maor

FOREIGN PATENT DOCUMENTS

CN 105162219 A 12/2015
CN 105446342 A 3/2016
 (Continued)

OTHER PUBLICATIONS

Chinese office action dated Jul. 2, 2018 for corresponding application No. 201611034249.X with English translation attached.

*Primary Examiner* — Yuen Wong
(74) *Attorney, Agent, or Firm* — Nath, Goldberg & Meyer; Joshua B. Goldberg

(57) ABSTRACT

The present application discloses a delivery method and a delivery control device. The delivery method includes steps S1 to S3. In the step S1, request information sent by a user is acquired, the request information including user location information which indicates a current position of the user. In the Step S2, a delivery apparatus for the user is selected among at least two types of delivery apparatuses according to the user location information. In the Step S3, the selected delivery apparatus is controlled to deliver an article or service to the user.

5 Claims, 7 Drawing Sheets

(51) Int. Cl.
  *G01C 21/34* (2006.01)
  *B64C 39/02* (2006.01)
  *G06Q 10/08* (2012.01)

(52) U.S. Cl.
  CPC ......... *G05D 1/0291* (2013.01); *G06Q 10/083* (2013.01); *B64C 2201/128* (2013.01); *B64C 2201/145* (2013.01); *B64C 2201/146* (2013.01)

(58) Field of Classification Search
  CPC ........ B64C 2201/146; B64C 2201/128; B64C 2201/145; G06Q 10/083
  See application file for complete search history.

(56) References Cited

FOREIGN PATENT DOCUMENTS

| | | |
|---|---|---|
| CN | 105844349 A | 8/2016 |
| CN | 105976144 A | 9/2016 |

\* cited by examiner

DELIVERY METHOD AND DELIVERY CONTROL DEVICE

CROSS-REFERENCE TO RELATED APPLICATIONS

This patent application is division of U.S. patent application Ser. No. 15/813,659, filed on Nov. 15, 2017, entitled DELIVERY METHOD AND DELIVERY CONTROL DEVICE, which claims priority to Chinese Patent Application No. 201611034249.X, field on Nov. 16, 2016, the content of each of which is hereby incorporated by reference in its entirety.

TECHNICAL FIELD

The present disclosure relates to the field of intelligence service, and particularly to a delivery method and a delivery control device.

BACKGROUND

In some large venues, self-service apparatuses such as vending machines are typically placed within certain areas to provide corresponding articles or services to users, in view that a user may want some articles or services provided by articles according to the user's own needs.

SUMMARY

In one aspect, the present disclosure provides a delivery method, including:

step S1: acquiring request information sent by a user, the request information including user location information which indicates a current position of the user;

step S2: selecting, according to the user location information, a delivery apparatus for the user among at least two types of delivery apparatuses; and step S3: controlling the selected delivery apparatus to deliver an article and/or service to the user.

Optionally, the at least two types of delivery apparatuses include robots and unmanned aerial vehicles (UAVs). The step S2 includes determining whether a delivery type for the user is UAV delivery, robot delivery or unable to deliver according to the user location information, a location and a state of a robot, and a location and a state of a UAV, and determining an identifier of a delivery apparatus for delivering an article and/or service to the user among the delivery apparatuses.

Optionally, the state of a robot includes an idle state, a task execution state and other state(s), the state of a UAV includes an idle state and a task execution state, and the step S2 includes:

step S201: determining whether a first delivery type for the user is UAV delivery, provisional robot delivery or unable to deliver according to the user location information, respective location information of robots in the idle state or the task execution state, and respective location information of UAVs in the idle state; in a case where the first delivery type is determined to be unable to deliver, performing step S202, and in a case where the first delivery type is determined to be UAV delivery, performing step S203;

step S202: returning information for indicating a delivery request being failed to the user; and step S203: determining an identifier of a UAV in the idle state and closest to the user, and switching a state of the UAV having the determined identifier to the task execution state.

In a case where the delivery apparatus corresponding to the user is a UAV, the step S3 includes:

step S301: controlling a UAV having the determined identifier to deliver an article and/or service to the user.

Optionally, the step S201 includes:

step S2011: determining whether there is any robot in the idle state or the task execution state within a first area where the user is located; in a case where it is determined that there is a robot in the idle state or the task execution state within the first area, performing step S2012, and in a case where it is determined that there is no robot in the idle state or the task execution state within the first area, performing step S2013;

step S2012: determining whether or not the user is located within a non-robot active region according to the user location information; in a case where it is determined that the user is located within the non-robot active region, performing step S2013, and in a case where it is determined that the user is not located within the non-robot active region, determining the first delivery type for the user to be provisional robot delivery; and step S2013: determining whether there is any UAV in the idle state within a second area where the user is located; in a case where it is determined that there is a UAV in the idle state within the second area, determining the first delivery type for the user to be UAV delivery, and in a case where it is determined that there is no UAV in the idle state within the second area, determining the first delivery type for the user to be unable to deliver.

Optionally, in a case where the first delivery type is determined in the step S201 to be provisional robot delivery, the step S2 further includes:

step S204: acquiring the user location information for all users for which the first delivery type is determined to be provisional robot delivery within a first period of time, and performing a clustering process on the acquired user location information to obtain one or more first cluster areas and location information of respective first cluster centers of the one or more first cluster areas;

step S205: determining, for each first cluster center, whether a second delivery type for the first cluster center is UAV delivery or robot delivery according to the location information of the first cluster center and the number of users within the first cluster area corresponding to the first cluster center; in a case where the second delivery type for the first cluster center is determined to be UAV delivery, performing step S206, and in a case where the second delivery type for the first cluster center is determined to be robot delivery, performing step S207;

step S206: determining an identifier of a UAV in the idle state and closest to the first cluster center, and switching a state of the UAV having the determined identifier to the task execution state;

step S207: calculating delivery costs of robots in the idle state and robots in the task execution state for the first cluster center, the delivery cost of a robot for a first cluster center being associated with a distance from the robot to the first cluster center, and step S208: determining an identifier of a robot having the lowest delivery cost according to the delivery costs for respective robots calculated in the step S207, and switching a state of the robot having the determined identifier to the task execution state.

Optionally, the delivery cost of a robot in the idle state for a first cluster center is equal to a distance from the robot to the first cluster center;

in a case where an angle between a first direction from a robot in the task execution state towards a target position for a task being executed by the robot and a second direction from the robot in the task execution state towards the first cluster center is less than or equal to an angle threshold, the delivery cost of the robot in the task execution state for a first cluster center is equal to a distance from the robot in the task execution state to the first cluster center, in a case where the angle between the first direction and the second direction is larger than the angle threshold, the delivery cost of the robot in the task execution state for a first cluster center is equal to a sum of a distance from the robot in the task execution state to the target position and a distance from the target position to the first cluster center.

Optionally, the step S3 includes:

step S301: in a case where the first delivery type is determined in the step S201 to be UAV delivery and the identifier of the UAV in the idle state and closest to the user has been determined in the step S203, controlling the UAV having the determined identifier to deliver an article and/or service to the user;

step S302: in a case where the second delivery type is determined in the step S205 to be UAV delivery and the identifier of the UAV in the idle state and closest to the first cluster center has been determined in the step S206, controlling the UAV having the determined identifier to deliver an article and/or service to the first cluster center; and step S303: in a case where the second delivery type is determined in the step S205 to be robot delivery and the identifier of the robot having the lowest delivery cost has been determined in the step S208, controlling the robot having the determined identifier to deliver an article and/or service to the first cluster center corresponding to the robot having the determined identifier.

Optionally, the step S205 includes:

step S2051: determining, for each first cluster center, whether or not the number of users within the first cluster area corresponding to the first cluster center is less than a threshold number of users; in a case where it is determined that the number of users within the first cluster area corresponding to the first cluster center is less than the threshold number of users, performing step S2052, and in a case where it is determined that the number of users within the first cluster area corresponding to the first cluster center is larger than or equal to the threshold number of users, determining the second delivery type to be robot delivery; and step S2052: determining whether there is any robot in the idle state or the task execution state within a third area in which the first cluster center is located; in a case where it is determined that there is a robot in the idle state or the task execution state within the third area, determining the second delivery type for the first cluster center to be robot delivery, and in a case where it is determined that there is no robot in the idle state or the task execution state within the third area, determining the second delivery type for the first cluster center to be UAV delivery.

Optionally, the delivery method includes, subsequent to the step S3:

step S4: acquiring location information for all persons within a first region, and performing a clustering process on the acquired location information to obtain one or more second cluster area(s) and location information of respective second cluster center(s) of the one or more second cluster area(s), all second cluster center(s) constituting a first set and all robots in the idle state constituting a second set;

step S5: calculating, for each second cluster center in the first set, distances from the second cluster center to respective robots in the idle state in the second set;

step S6: selecting the minimum distance among the distances calculated in the step S5, and determining the second cluster center and the robot by which the minimum distance is calculated;

step S7: controlling the robot determined in the step S6 to move towards the second cluster center determined in the step S6, and switching a state of the robot determined in the step S6 from the idle state to an optimizing distribution state;

step S8: removing the second cluster center determined in the step S6 from the first set, and removing the robot determined in the step S6 from the second set; and step S9: determining whether or not each of the first set and the second set is an empty set, and in a case where none of the first set and the second set is an empty set, returning to the step S5.

Optionally, the delivery method further includes:

step S10: determining whether or not a battery power of each of the robots in the idle state is less than a battery power threshold, and in a case where it is determined that the battery power of the robot in the idle state is less than the battery power threshold, performing step S11;

step S11: controlling the robot of which the battery power is less than the battery power threshold to move to a predetermined charging station to charge itself, and switching a state of the robot of which the battery power is less than the battery power threshold to a charging state.

In another aspect, the present disclosure further provides a delivery control device, which includes a storage device and one or more processors coupled to the storage device. The storage device is configured to store computer-executable instructions, which when executed by the one or more processors, cause the one or more processors to perform the following operations:

acquiring request information sent by a user, the request information including user location information which indicates a current position of the user, selecting, according to the user location information, a delivery apparatus for the user among at least two types of delivery apparatuses; and controlling the selected delivery apparatus to deliver an article and/or service to the user.

Optionally, the at least two types of delivery apparatuses include robots and UAVs, and the storage device is configured to store computer-executable instructions, which when executed by the one or more processors, cause the one or more processors to perform the following operations:

determining whether a delivery type for the user is UAV delivery, robot delivery or unable to deliver according to the user location information, a location and a state of a robot, and a location and a state of a UAV, and determining an identifier of a specific delivery apparatus for delivering an article and/or service to the user among the delivery apparatuses.

Optionally, the state of a robot includes an idle state, a task execution state and other state(s), the state of a UAV includes an idle state and a task execution state, and the storage device is configured to store computer-executable instructions, which when executed by the one or more processors, cause the one or more processors to perform the following operations:

determining whether a first delivery type for the user is UAV delivery, provisional robot delivery or unable to deliver according to the user location information, respective location information of the robots in the idle state or the task execution state, and respective location information of the UAVs in the idle state;

in a case where the first delivery type is determined to be unable to deliver, returning information for indicating a delivery request being failed to the user; and in a case where the first delivery type is determined to be UAV delivery, determining an identifier of a UAV in the idle state and closest to the user, switching a state of the UAV having the determined identifier to the task execution state, and controlling the UAV having the determined identifier to deliver an article and/or service to the user.

Optionally, the storage device is configured to store computer-executable instructions, which when executed by the one or more processors, cause the one or more processors to perform the following operations:

determining whether there is any robot in the idle state or the task execution state within a first area where the user is located;

in a case where it is determined that there is a robot in the idle state or the task execution state within the first area, determining whether or not the user is located within a non-robot active region according to the user location information;

in a case where it is determined that there is no robot in the idle state or the task execution state within the first area or it is determined that the user is located within the non-robot active region, determining whether there is any UAV in the idle state within a second area that is an area encircled by a circle, a circular center of which is a position of the user and a radius of which is a second predetermined distance;

in a case where it is determined that the user is not located within the non-robot active region, determining the first delivery type for the user to be provisional robot delivery; in a case where it is determined that there is a UAV in the idle state within the second area, determining the first delivery type to be UAV delivery, and in a case where it is determined that there is no UAV in the idle state within the second area, determining the first delivery type to be unable to deliver.

Optionally, the storage device is configured to store computer-executable instructions, which when executed by the one or more processors, cause the one or more processors to perform the following operations:

acquiring the user location information for all users for which the first delivery type is determined to be provisional robot delivery within a first period of time, and performing a clustering process on the acquired user location information to obtain one or more first cluster area(s) and location information of respective first cluster center(s) of the one or more first cluster area(s);

determining, for each first cluster center, whether a second delivery type for the first cluster center is UAV delivery or robot delivery according to the location information of the first cluster center and the number of users within the first cluster area corresponding to the first cluster center;

in a case where the second delivery type for the first cluster center is determined to be UAV delivery, determining an identifier of a UAV in the idle state and closest to the first cluster center, and switching a state of the UAV having the determined identifier to the task execution state;

in a case where the second delivery type for the first cluster center is determined to be robot delivery, calculating delivery costs of robots in the idle state and robots in the task execution state, the delivery cost of a robot for a first cluster center being associated with a distance from the robot to the first cluster center, determining an identifier of a robot having the lowest delivery cost; and switching a state of the robot having the determined identifier to the task execution state;

after the state of the UAV having the determined identifier is switched to the task execution state, controlling the UAV having the determined identifier to deliver an article and/or service to the first cluster center; and after the state of the robot having the determined identifier is switched to the task execution state, controlling the robot having the determined identifier to deliver an article and/or service to the first cluster center.

Optionally, the storage device is configured to store computer-executable instructions, which when executed by the one or more processors, cause the one or more processors to perform the following operations:

determining, for each first cluster center, whether or not the number of users within the first cluster area corresponding to the first cluster center is less than a threshold number of users;

in a case where it is determined that the number of users within the first cluster area corresponding to the first cluster center is less than the threshold number of users, determining whether there is any robot in the idle state or the task execution state within a third area in which the first cluster center is located; and in a case where it is determined that the number of users within the first cluster area corresponding to the first cluster center is larger than or equal to the threshold number of users, determining the second delivery type to be robot delivery; in a case where it is determined that there is a robot in the idle state or the task execution state within the third area, determining the second delivery type for the first cluster center to be robot delivery; and in a case where it is determined that there is no robot in the idle state or the task execution state within the third area, determining the second delivery type for the first cluster center to be UAV delivery.

Optionally, the at least two types of delivery apparatuses include robots and UAVs, and the storage device is configured to store computer-executable instructions, which when executed by the one or more processors, cause the one or more processors to perform the following operations:

acquiring location information for all persons within a first region, and performing a clustering process on the acquired location information for all persons to obtain one or more second cluster areas and location information of respective second cluster centers of the one or more second cluster areas, all second cluster centers constituting a first set and all robots in the idle state constituting a second set;

calculating, for each second cluster center in the first set, distances from the second cluster center to respective robots in the idle state in the second set;

selecting the minimum distance among the calculated distances, and determining the second cluster center and the robot by which the minimum distance is calculated;

controlling the determined robot to move towards the determined second cluster center, and switching a state of the determined robot from the idle state to an optimizing distribution state;

removing the determined second cluster center from the first set, and removing the determined robot from the second set; and determining whether or not each of the first set and the second set is an empty set, and in a case where none of the first set and the second set is an empty set, performing the calculation of the distances again.

Optionally, the at least two types of delivery apparatuses include robots and UAVs, and the storage device is configured to store computer-executable instructions, which when executed by the one or more processors, cause the one or more processors to perform the following operations:

determining whether or not a battery power of each of the robots in the idle state is less than a battery power threshold; and in a case where it is determined that the battery power of the robot is less than the battery power threshold, controlling the robot of which the battery power is less than the battery power threshold to move to a predetermined charging station to charge itself, and switching a state of the robot of which the battery power is less than the battery power threshold to a charging state.

DETAILED DESCRIPTION

Figure 1:
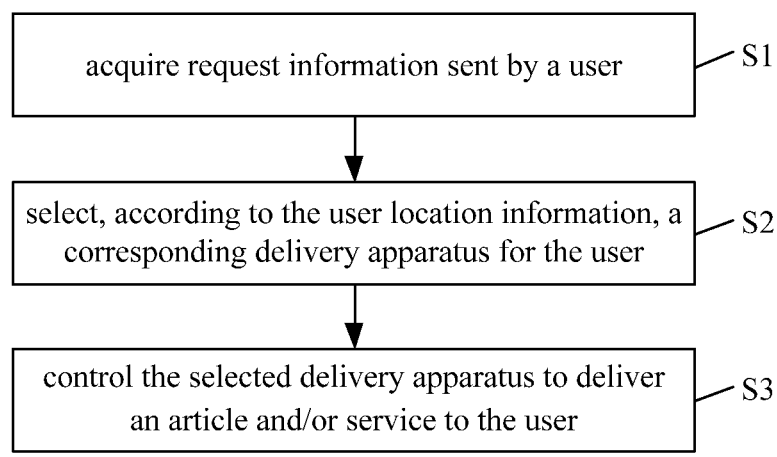
FIG. 1 is a flow chart of a delivery method according to an embodiment of the present disclosure.

To make those skilled in the art better understand the technical solutions of the present disclosure, a delivery method and a delivery control apparatus according to the present disclosure will be further described in detail below in conjunction with the accompanying drawings.

It should be noted that, the term "robot" herein refers to a machine apparatus capable of automatically executing tasks according to corresponding instructions, which can carry a large amount of articles for selection by a user so as to adapt intelligence service scenarios. The term "unmanned aerial vehicle" (UAV) herein refers to an unmanned aircraft operated by a radio remote control device and its own program control device, which can carry a certain amount of articles for selection by a user. Compared with robots, UAVs move faster and can travel farther, but UAVs cost more to travel per unit distance. Both robots and UAVs are equipped with differential GPS for positioning. In addition to articles, the robots and UAVs can also provide service to users. The service is not limited to a self-service provided by a vending machine described as a background, and it can be any service as long as a facility for providing the service can be integrated with the robots and UAVs.

To facilitate management of the system, a state of the robot in the present disclosure can be switched among an idle state, a task execution state, a task completion state, a charging state and an optimizing distribution state. A state of the UAV in the present disclosure can be switched among an idle state, a task execution state, and a task completion state.

The term "idle state" herein refers to a state in which a robot/UAV is currently idle (i.e., the robot/UAV has no delivery task). The term "task execution state" herein refers to a state in which a robot/UAV is executing a task (i.e., the robot/UAV has a specific target position to go). For robots, the term "task completion state" herein refers to a state to which a robot is automatically switched in-situ after it completes a task and in which the robot waits for a next instruction (e.g., an instruction for controlling the robot to switch from the task completion state to the idle state by the system) from the system. For UAVs, a UAV automatically returns to a departure position (e.g., a corresponding parking apron) of the UAV after it completes a task and waits for a next instruction from the system after it returns to the departure position, and thus the term "task completion state" herein refers to a state in which the UAV is returning from a target position for a task executed by the UAV to the departure position, arriving at the departure position and waiting until receiving a next instruction. The term "charging state" herein refers to a state in which a robot is charging. The term "optimizing distribution state" herein refers to a state in which a robot currently executes no task but is required to move to a position indicated by an instruction of the system (for example, optimization instruction) according to the instruction of the system.

In addition, the term "user" in the present disclosure refers to a human being or an apparatus currently requesting a self service, and the term "persons" refers to general human beings, including a group of current users and a group of non-users.

A conventional self-service apparatus is pre-placed by a designer of a venue, and thus the location thereof is fixed and unadjustable, resulting in that a user has to move to a particular position to get a corresponding service, thereby having some limitations.

FIG. 1 is a flow chart of a delivery method according to an embodiment of the present disclosure. As illustrated in FIG. 1, the delivery method includes steps S1 to S3.

In the step S1, request information sent by a user is acquired, wherein the request information includes user location information which indicates a current position of the user.

For example, when a user needs self-service or an article, the user can send request information to a corresponding delivery control device through a mobile terminal such as a mobile phone, a tablet or the like, and the request information contains user location information indicating a current position of the user. Needless to say, the request information may contain other information such as identity information of the user.

The delivery control device receives the request information sent by the user and thus may be informed of the current position of the user.

In the step S2, a delivery apparatus is selected for the user among at least two types of delivery apparatuses, according to the user location information.

Optionally, the delivery apparatuses include robots and UAVs. In the step S2, the delivery control device determines whether a UAV or a robot is employed to deliver an article or service to the user according to the received user location information.

In the step S3, the selected delivery apparatus is controlled to deliver an article and/or service to the user who sends the request information.

In the step S3, the UAV or robot selected in the step S2 is controlled to move to a position where the user who has sent the request information is located or close to so as to provide self-service or article to the user.

It should be noted that the delivery apparatuses according to the embodiment are not limited to UAVs and robots, and they may be other apparatuses with functions of delivery and dispatching.

In the delivery method according to the present disclosure, a self-service or an article is provided to a user by acquiring position information of a user who needs the self-service or the article and selecting a corresponding delivery apparatus to move to the position where the user is located or close to. The delivery method breaks the restriction in the prior art that the self-service apparatus is at a fixed location that cannot be adjusted, so that the user can conveniently use self-service or required articles anywhere, thereby improving the user experience.

Figure 2:
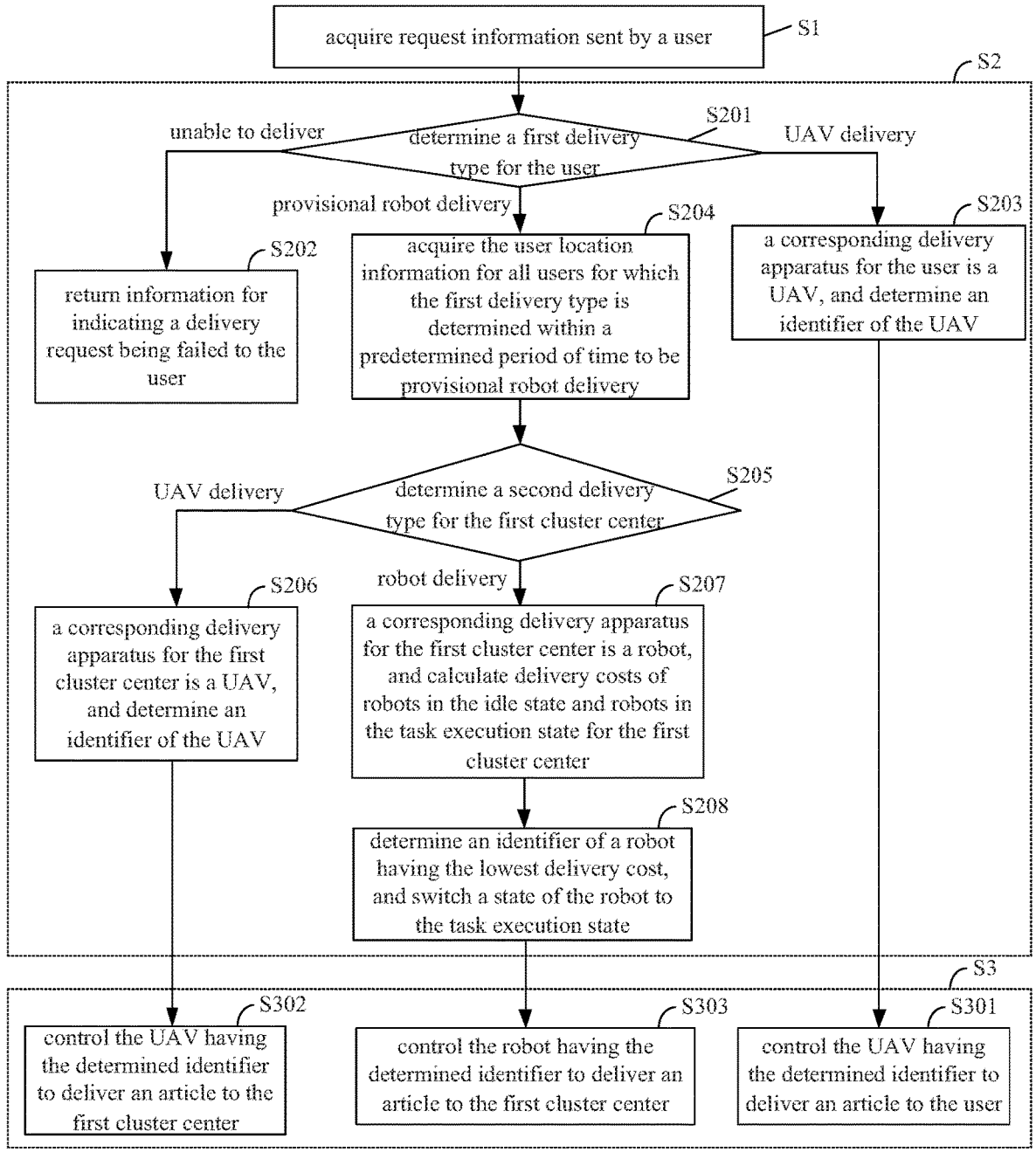
FIG. 2 is a flow chart of a delivery method according to an embodiment of the present disclosure.

FIG. 2 is a flow chart of a delivery method according to an embodiment of the present disclosure. In the delivery method, the delivery apparatuses include UAVs and robots. As illustrated in FIG. 2, the delivery method includes step S1, steps S201 to S208, and steps S301 to S303.

In the step S1, request information sent by a user is acquired, wherein the request information includes user location information which indicates a current position of the user.

In the step S201, a first delivery type for the user is determined according to the user location information, respective location information of the robots in the idle state or the task execution state, and respective location information of the UAVs in the idle state.

Optionally, the first delivery type includes UAV delivery, provisional robot delivery or unable to deliver.

Figure 3:
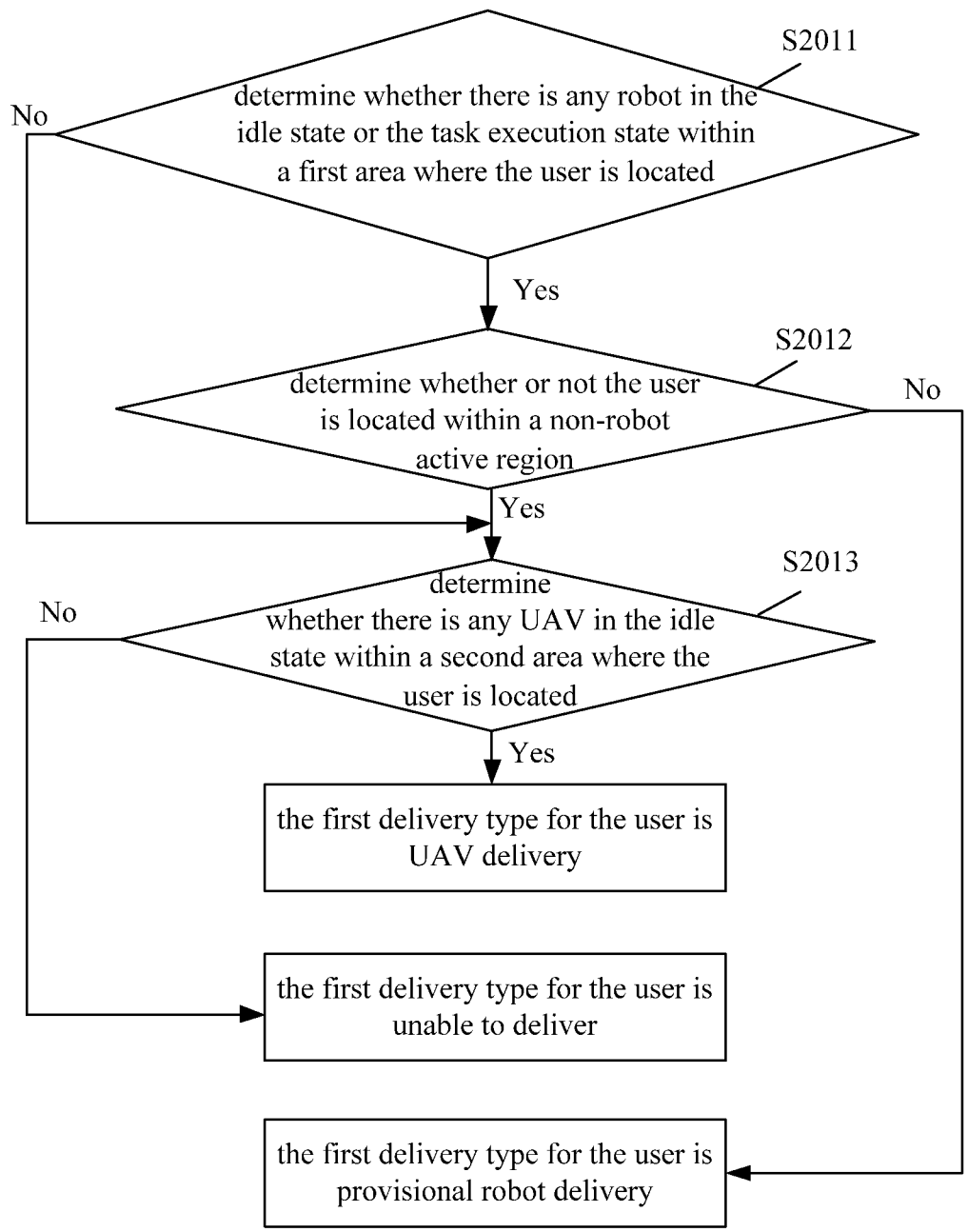
FIG. 3 is a flow chart specifically illustrating step S201 of the delivery method according to an embodiment of the present disclosure.

FIG. 3 is a flow chart specifically illustrating step S201 of the delivery method according to an embodiment of the present disclosure. As illustrated in FIG. 3, optionally, the step S201 includes steps S2011 to S2013.

In the step S2011, it is determined whether there is any robot in the idle state or the task execution state within a first area where the user is located.

In one example, the first area is an area encircled by a circle, a circular center of which is the position of the user and a radius of which is a first predetermined distance.

In practice, a robot can be taken into consideration for delivery in view of the costs of a robot and a UAV. The first predetermined distance in this example may be set according to the maximum distance for a single movement of a robot. For example, if the maximum distance for a single movement of a robot is 1 kilometer, the first predetermined distance may be set to a value less than or equal to 1 kilometer.

In the step S2011, if it is determined that there is a robot in the idle state or the task execution state within the first area where the user is located, it indicates that the robot is capable of moving to the position where the user is located, and in this case, step S2012 is performed; otherwise, it indicates that no robot can move to the position where the user is located, and in this case, step S2013 is performed.

In the step S2012, it is determined whether or not the user is located within a non-robot active region according to the user location information.

Although there is a robot in the idle state or the task execution state within the first area where the user is located, if the user is located within the non-robot active region which is a region where a robot cannot reach due to limitation of environment, topography and the like and can be defined in advance, it indicates that a robot cannot be employed for delivering.

In the present disclosure, it indicates that a robot can be employed for delivering to a user when it is determined in the step S2012 that the user is not within the non-robot active region, and in this case, the first delivery type for the user is determined to be provisional robot delivery. When it is determined in the step S2012 that the user is located with the non-robot active region, it indicates that UAV delivery is required for the user or that it is unable to deliver for the user, and in this case, the step S2013 is performed.

In the step S2013, it is determined whether there is any UAV in the idle state within a second area where the user is located.

In one example, the second area is an area encircled by a circle, a circular center of which is the position of the user and a radius of which is a second predetermined distance.

The second predetermined distance in this example may be set according to the maximum distance for a single movement of a UAV. For example, if the maximum distance for a single movement of a UAV is 2 kilometers, the second predetermined distance may be set to a value less than or equal to 2 kilometers. In practice, the second predetermined distance is typically larger than the first predetermined distance. For example, a value of the second predetermined distance may be 2 kilometers, and a value of the first predetermined distance may be 1 kilometer.

If it is determined in the step S2013 that there is a UAV in the idle state within the second area, it indicates that a UAV can be employed for delivering to the user, and in this case, it is determined that the first delivery type for the user is UAV delivery; otherwise, it is determined that the first delivery type for the user is unable to deliver.

It should be noted that in a case where it is determined in the step S201 that the first delivery type for the user is unable to deliver, the step S202 is performed; in a case where it is determined in the step S201 that the first delivery type for the user is UAV delivery, the step S203 is performed; and in a case where it is determined in the step S201 that the first delivery type for the user is provisional robot delivery, the step S204 is performed.

In the step S202, information for indicating a delivery request being failed is returned to the user.

When there is no robot or UAV available to deliver for the user, the information for indicating a delivery request being failed is returned to the user. The user may try to send request information again after a period of time or after changing the user's own position.

In the step S203, the delivery apparatus corresponding to the user is a UAV, an identifier (for example, a serial number of the UAV) of a UAV in the idle state and closest to the user is determined, and a state of the UAV having the determined identifier is switched to the task execution state.

In the step S203, it is determined for a user whose first delivery type is UAV delivery that the delivery apparatus corresponding to the user is a UAV. In this case, distances from the user to respective UAVs in the idle state may be calculated, and an identifier of a UAV having the minimum distance is determined and, at the same time, a state of the UAV having the determined identifier is switched to the task execution state.

In the step S204, the user location information for all users for which the first delivery type is determined to be provisional robot delivery within a first period of time (e.g., a predetermined period of time), and clustering process is performed on the acquired user location information to obtain one or more first cluster area(s) and location information of respective first cluster center(s) of the one or more first cluster area(s).

In the present disclosure, the delivery is conducted in a centralized manner for the user whose first delivery type is provisional robot delivery. Specifically, the user location information for all users whose first delivery type is determined to be provisional robot delivery within a first period of time (e.g., one minute) is acquired, and the clustering process is performed on all acquired user location information by using clustering algorithm to obtain one or more first cluster areas and location information of respective first cluster centers of the one or more first cluster areas.

It should be noted that the clustering algorithm used in the process of clustering the user location information in the present disclosure may be any clustering algorithm in the prior art, and the specific process of clustering multiple coordinates (user location information) by using clustering algorithm is not described in detail here. In the present disclosure, location information of one or more first cluster areas and respective cluster center(s) of the one or more first cluster areas may be obtained by the clustering process.

During subsequent allocation of delivery tasks, the delivery may be conducted in units of the first cluster area (each including one or more users). For example, the delivery is conducted to the first cluster center of each first cluster area.

In the step S205, a second delivery type for each first cluster center is determined according to the location information of the first cluster center and the number of users within the first cluster area corresponding to the first cluster center.

In the step S205, it may be determined for each first cluster center whether the second delivery type of the first cluster center is UAV delivery or robot delivery, according to the location information of the first cluster center and the number of users within the first cluster area corresponding to the first cluster center.

Figure 4:
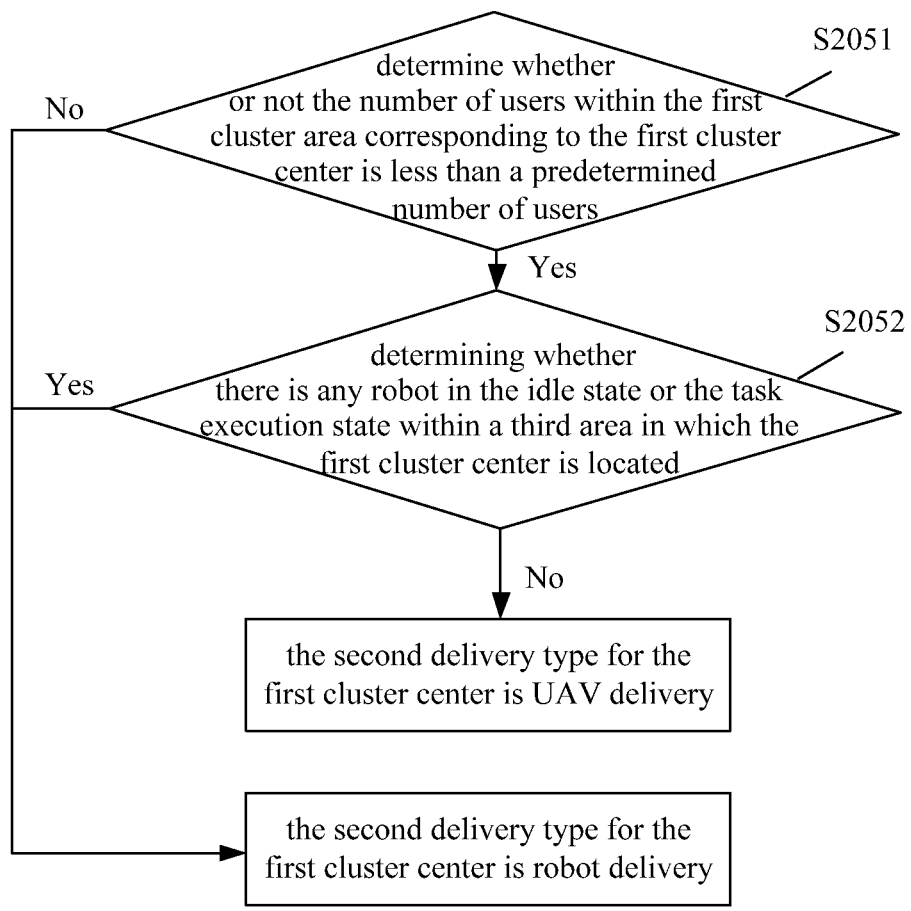
FIG. 4 is a flow chart specifically illustrating step S205 of the delivery method according to an embodiment of the present disclosure.

FIG. 4 is a flow chart specifically illustrating step S205 of the delivery method according to an embodiment of the present disclosure. As illustrated in FIG. 4, optionally, the step S205 includes steps S2051 and S2052.

In the step S2051, it is determined for each first cluster center whether or not the number of users within the first cluster area corresponding to the first cluster center is less than a threshold number of users.

For the first cluster area with a relatively large number of users, a robot with a relatively large article carrying capacity must be used for delivery. For the first cluster area with a relatively small number of users, not only a robot but also a UAV may be used for delivery.

In the present disclosure, the threshold number of users may be set depending on actual situation.

In the step S2051, if it is determined that the number of users within the first cluster area is larger than or equal to the threshold number of users, it indicates that the first cluster area has a relatively large number of users therein, and in this case, it may be determined that the first cluster center for the first cluster area has the second delivery type of robot delivery. If it is determined that the number of users within the first cluster area is less than the threshold number of users, the step S2052 is performed.

In the step S2052, it is determined for each first cluster center whether there is any robot in the idle state or the task execution state within a third area in which the first cluster center is located.

In one example, the third area is an area encircled by a circle, a circular center of which is the first cluster center and a radius of which is a third predetermined distance. In practice, the third predetermined distance is typically a relatively small value that is less than a half of the first predetermined distance, e.g., 200 meters.

In the step S2052, if it is determined that there is a robot in the idle state or the task execution state within the third area where the first cluster center is located, it indicates that there is a robot close to the first cluster center and capable of executing delivery task, and in this case, the second delivery type for the first cluster center is determined to be robot delivery. If it is determined that there is no robot in the idle state or the task execution state within the third area where the first cluster center is located, the second delivery type for the first cluster center is determined to be UAV delivery.

It should be noted that, when it is determined that there is no robot in the idle state or in the task execution state within the third area where the first cluster center is located, it is theoretically possible to use not only UAV delivery but also robot delivery for the first cluster center. However, in this embodiment, the delivery is conducted by using a UAV in view of the rapid delivery characteristic of UAVs.

Therefore, the delivery time can be reduced, thereby effectively enhancing user experience.

When it is determined in the step S205 that the second delivery type for the first cluster center is UAV delivery, the step S206 is performed. When it is determined in the step S207 that the second delivery type for the first cluster center is robot delivery, the step S207 is performed.

In the step S206, an identifier of a UAV in the idle state and closest to the first cluster center is determined, and a state of the UAV having the determined identifier is switched to the task execution state.

For the first cluster center with the second delivery type of UAV delivery, it is determined that the delivery apparatus for the first cluster center is a UAV. In this case, distances from the first cluster center to respective UAVs in the idle state may be calculated, and an identifier of a UAV with the minimum distance value may be determined, and at the same time, a state of the UAV having the determined identifier is switched to the task execution state.

It can be seen from the above that, in the present disclosure, the actual delivery apparatus corresponding to users whose first delivery type is provisional robot delivery may be a UAV.

In the step S207, delivery costs of robots in the idle state and robots in the task execution state are calculated for each first cluster center, the delivery cost for a first cluster center being associated with a distance from a robot to the first cluster center.

In one example, the delivery cost of a robot in the idle state for a first cluster center is equal to a distance from the robot to the first cluster center.

In one example, when a robot is in the task execution state, a direction from the robot towards a target position for a task being executed is a first direction, and a direction from the robot towards the first cluster center is a second direction. In a case where an angle between the first direction and the second direction is less than or equal to an angle threshold, the delivery cost of the robot for a first cluster center is equal to a distance from the robot to the first cluster center. In a case where the angle between the first direction and the second direction is larger than the angle threshold, the delivery cost of the robot for a first cluster center is equal to a sum of a distance from the robot to the target position and a distance from the target position to the first cluster center.

Figure 5:
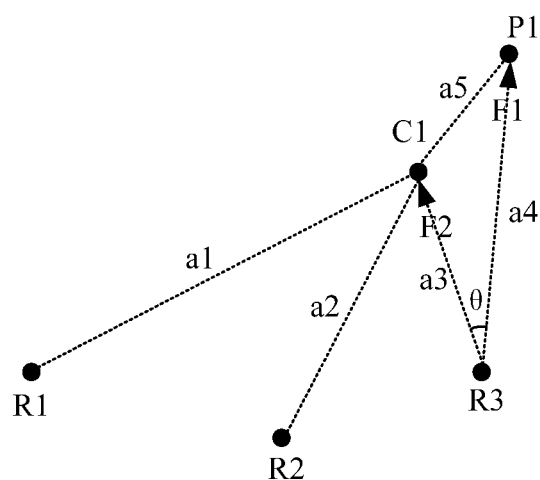
FIG. 5 is a schematic diagram illustrating a calculation of a delivery cost according to an embodiment of the present disclosure.

FIG. 5 is a schematic diagram illustrating a calculation of a delivery cost in one example. As illustrated in FIG. 5, it is assumed that a first cluster center C1 represents a cluster center having a robot as its delivery apparatus, robots R1 and R2 represent robots in the idle state, respectively, a robot R3 represents a robot in the task execution state, and P1 indicates a target position for a task currently being executed by the robot R3.

It is assumed that a distance from the robot R1 to the first cluster center C1 is a1, a distance from the robot R2 to the first cluster center C1 is a2, a distance from the robot R3 to the first cluster center C1 is a3, a distance from the robot R3 to the target position P1 is a4, a distance from the first cluster center C1 to the target position P1 is a5, a direction from the robot R3 towards the target position P1 is the first direction F1, a direction from the robot R3 towards the first cluster center C1 is the second direction F2, and an angle between the first direction and the second direction is θ.

In this case, the delivery cost of the robot R1 is equal to the distance a1, and the delivery of the robot R2 for the first cluster center C1 is equal to the distance a2.

For the robot R3, if the angle θ is less than or equal to an angle threshold, it indicates that the robot R3, the first cluster center C1 and the target position P1 are approximately on one straight line. In this case, the robot R3 may complete incidentally the delivery to the first cluster center C1 even in the task execution state, and the delivery cost of the robot R3 is equal to the distance a3. It should be noted that, if the robot R3 is used to deliver for the first cluster center C1 in a subsequent process, in a case where the distance a3 is less than the distance a4, the robot R3 may execute the delivery to the first cluster center C1 first and then to the target position P1. In a case where the distance a3 is larger than or equal to the distance a4, the robot R3 may execute the delivery to the target position P1 first and then to the first cluster center C1.

If the angle θ is larger than the angle threshold, the robot R3 needs to complete the task of delivering for the target position P1 and then execute the task of delivering for the first cluster center C1. In this case, the delivery cost of the robot R3 is equal to a sum of the distance a4 and the distance a5.

It should be noted that, the angle threshold in the present disclosure may be set depending on actual situation.

In the step S208, an identifier of a robot having the lowest delivery cost is determined, and a state of the robot having the determined identifier is switched to the task execution state.

Taking the case shown in FIG. 5 as an example, in a case where the angle θ is less than or equal to the angle threshold, it needs in the step S208 to compare values of the distance a1, the distance a2 and the distance a3, and select an identifier of a robot corresponding to the minimum distance value. In a case where the angle θ is larger than the angle threshold, it needs in the step S208 to compare values of the distance a1, the distance a2 and the sum of the distances a4 and a5, and select an identifier of a robot corresponding to the minimum distance value.

Upon an identifier of the robot with the lowest delivery cost is determined, the state of the robot having the identifier is switched to the task execution state. It should be noted that, if the robot with the lowest delivery cost determined in the step S208 is in the task execution state, the task execution state of the robot may be maintained and a new task may be assigned to the robot.

It should be noted that when robots or UAVs are continuously assigned to each first cluster center, there may be a problem that the robots and the UAVs are insufficient. In this case, request information for all users within the first cluster areas that respectively correspond to the unassigned first cluster centers may be stored, and may be included into the user location information for all users whose first delivery type to be acquired in the next first period of time is provisional robot delivery, so as to be further processed.

The method proceeds to the step S3 when any one of the step S203, step S206 and step S208 is completed.

Specifically, the subsequent step S3 after the step S203 is completed includes step S301 in which a UAV with the determined identifier is controlled to delivery an article and/or service to a corresponding user.

The delivery control device controls the UAV with the determined identifier to move to the user's location to provide self-service or an article to the user. After the user finishes self-service or gets the article, a state of the UAV is automatically switched to the task completion state and the UAV flies back to a corresponding parking apron.

Specifically, the subsequent step S3 after the step S206 is completed includes step S302 in which a UAV with the determined identifier is controlled to delivery an article and/or service to a corresponding first cluster center.

The delivery control device controls the UAV with the determined identifier to move to the first cluster center, and sends information, which is for reminding all users in the first cluster area corresponding to the first cluster center to go to the first cluster center, to the users when the UAV is arriving or has arrived at the first cluster center, so as to provide self-service or an article to all the users in the first cluster area. After the self-service or article has been provided to all the users in the first cluster area, a state of the UAV is automatically switched to the task completion state and the UAV flies back to a corresponding parking apron.

It should be noted that, in one example, the UAV is not limited to moving to the first cluster center, but may also move to each user in the first cluster area to deliver the service or article for each user separately.

Specifically, the subsequent step S3 after the step S208 is completed includes step S303, in which a robot with the determined identifier is controlled to delivery an article to the first cluster center.

The delivery control device controls the robot with the determined identifier to move to the first cluster center, and sends information, which is for reminding all users in the first cluster area corresponding to the first cluster center to go to the first cluster center, to the users when the robot is arriving or has arrived at the first cluster center, so as to provide self-service or an article to all the users in the first cluster area. After the self-service or article has been provided to all the users in the first cluster area, a state of the robot is automatically switched to the task completion state and waits for a next instruction from the delivery control device. In a case where the robot has other task(s) to be executed, the delivery control device controls the robot to switch its own state to the task execution state again and to move to a target position for the next task. In a case where the robot has no task to be executed, the delivery control device controls the robot to switch its own state to the idle state and maintain the idle state.

Figure 6:
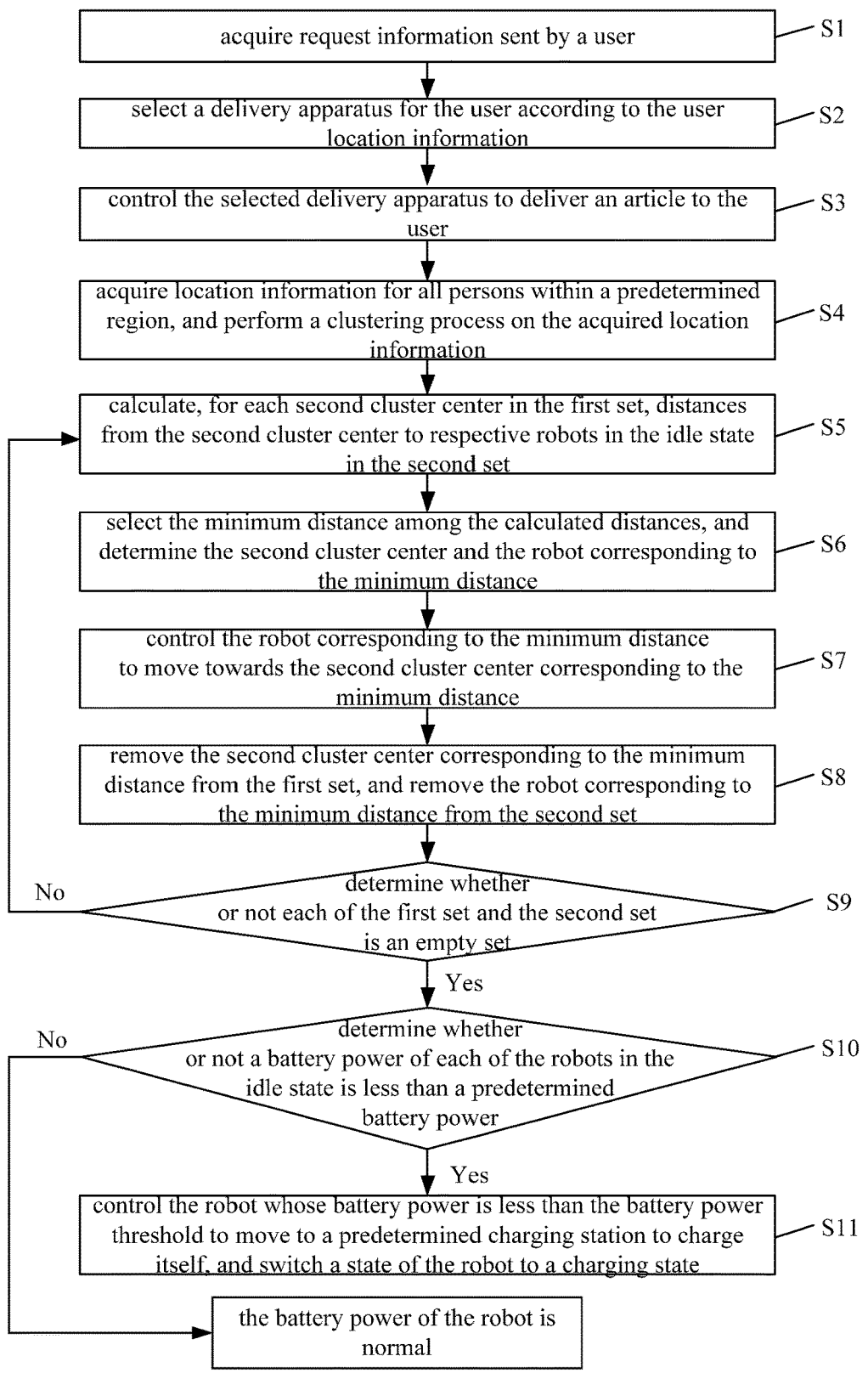
FIG. 6 is a flow chart of a delivery method according to an embodiment of the present disclosure.

FIG. 6 is a flow chart of a delivery method according to an embodiment of the present disclosure. As illustrated in FIG. 6, in addition to the steps S1 to S3 in the above example, the delivery method further includes steps S4 to S11 after the step S3. Only the steps S4 to S11 will be described below.

In the step S4, location information for all persons within a first region (e.g., a predetermined area) is acquired, and a clustering process is performed on the acquired location information for all persons within the first region to obtain one or more second cluster areas and location information of respective second cluster centers of the one or more second cluster areas, all second cluster centers constituting a first set and all robots in the idle state constituting a second set.

Persons within the first region are divided into two types: users and non-users. In one example, in the step S4, the location information of all the persons in the first region may be obtained by collecting mobile network signals for mobile phones of the users and non-users in the first region and using the mobile network signals to locate the location of the mobile phone (and the person holding the mobile phone). It should be noted that, the technical means for locating by using a mobile network signal is a common technical means in the art, and a specific process thereof is not described in detail herein.

After the location information of all the persons within the first region is acquired, the acquired location information of all persons within the first region is clustered by using a clustering algorithm to obtain one or more second cluster areas and location information of respective second cluster centers of the one or more second cluster area(s). In this example, the clustering process is performed on the location information of all the users within the first region, and a result thereof can effectively reflect the population density distribution in the first region to provide reference for the subsequent optimizing distribution adjustment.

To facility the subsequent process of optimizing distribution, all the second cluster centers constitute a first set and all robots in the idle state constitute a second set.

In the step S5, distances from the second cluster center to respective robots in the idle state in the second set are calculated for each second cluster center in the first set.

In the step S6, the minimum distance is selected among the calculated distances, and the second cluster center and the robot by which the minimum distance is calculated are determined.

In the step S7, the robot determined in the step S6 is controlled to move towards the second cluster center determined in the step S6, and a state of the robot determined in the step S6 is switched from the idle state to an optimizing distribution state.

In each adjustment, the robot in the idle state with the minimum adjustment cost (namely, moving distance) is selected to go to a corresponding second cluster center.

In the step S8, the second cluster center determined in the step S6 is removed from the first set, and the robot determined in the step S6 is removed from the second set.

In the step S9, it is determined whether or not each of the first set and the second set is an empty set.

In a case where none of the first set and the second set is determined to be an empty set in the step S9, the method returns to the step S5 to proceed with the optimizing distribution adjustment. In a case where at least one of the first set and the second set is determined to be an empty set in the step S9, the optimizing distribution adjustment ends, and states of respective robots in the optimizing distribution state are switched to the idle state.

In the present disclosure, a robot in the idle state can automatically adjust its own position according to the current population density distribution, such that the probability that the delivery can be conducted by a robot in the idle state is increased in the subsequent assignment of tasks, and the delivery distance of the robot is shortened effectively, which can shorten the delivery time and thereby effectively improve the user experience.

In the step S10, it is determined whether or not a battery power of each of the robots in the idle state is less than a battery power threshold.

In a case where the battery power of a robot is determined to be less than the battery power threshold, the step S11 is performed; otherwise, it indicates that the battery power is normal.

It should be noted that, the battery power threshold may be set depending on actual needs.

In the step S11, the robot of which the battery power is less than the battery power threshold is controlled to move to a charging station to charge itself, and a state of the robot is switched to the charging state.

In one example, the population density may be surveyed in advance and an area with more concentrated population density may be analyzed, and then a charging station may be built in the area for the charging of a robot. Needless to say, a position of a charging station may be set according to other needs.

In a case where the battery power of a certain robot is determined in the step S10 to be less than the battery power threshold, the delivery control device controls the robot to move to the charging station with available charging pile and closest to the robot to charge itself, and switch a state of the robot to the charging state. When the robot completes charging, the state of the robot will be switched to the idle state again.

It should be noted that the order of the steps S10 and S4 is not limited, and the step S10 may also be performed before the step S4 or simultaneously with the step S4. It should be understood by those skilled in the art that the only requirement of the order is that, both the steps S4 and S10 should be performed after step S3, the steps S5 to S9 should be performed after the step S4, and the step S11 should be performed after the step S10, and specific combination thereof is no longer listed herein.

In addition, the step S2 may be replaced with the steps S201 to S208 described with reference to FIG. 2, and the step S3 may be replaced with the steps S301 to S303 described with reference to FIG. 2.

The delivery method according to the present disclosure not only provides users with self-service or articles anytime and anywhere, but also effectively improves the user experience by optimizing the distribution. Further, providing the charging station may effectively keep the robot operating automatically and continuously.

Figure 7:
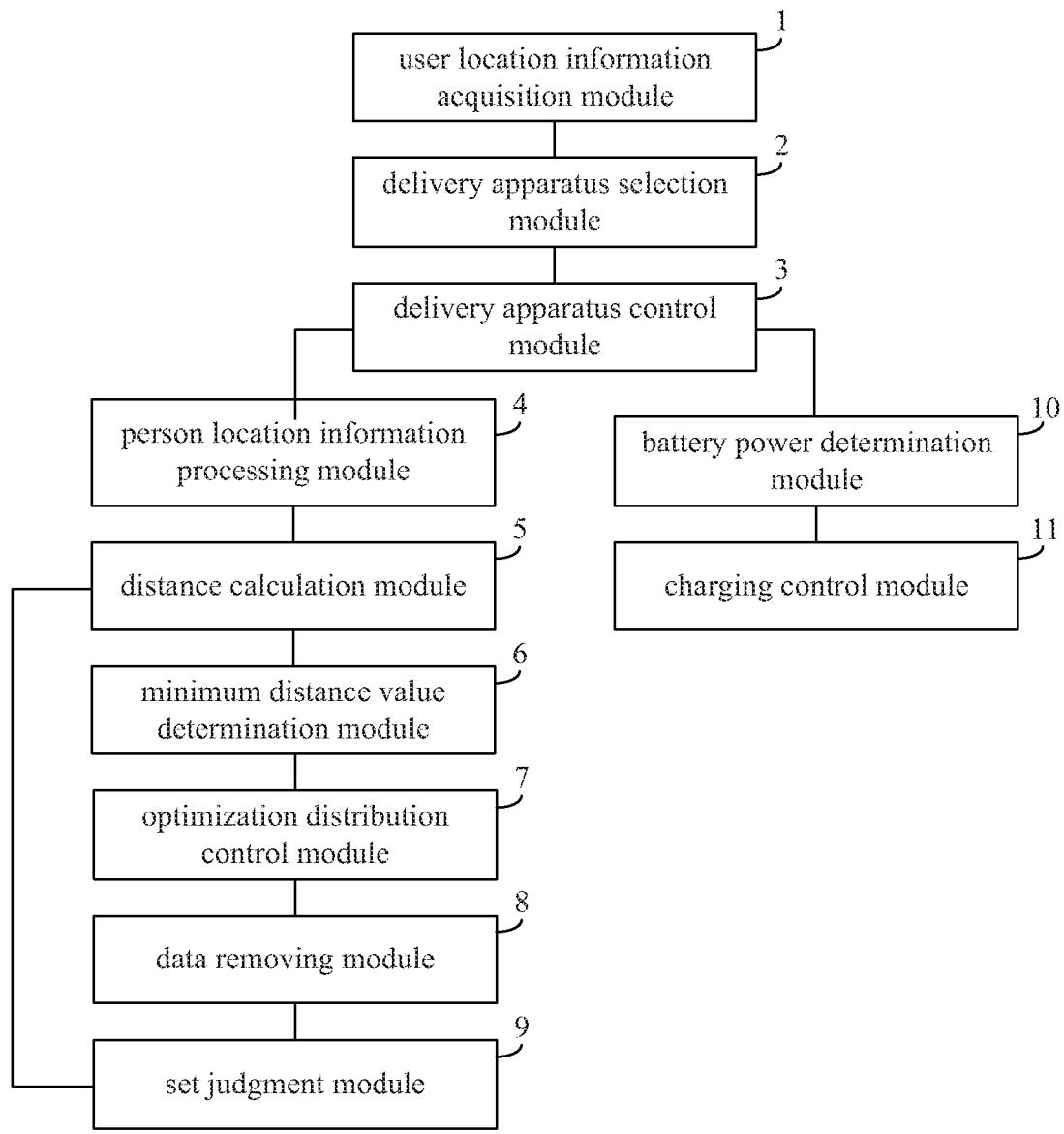
FIG. 7 is a schematic diagram illustrating a structure of a delivery control device according to an embodiment of the present disclosure.

FIG. 7 is a schematic diagram illustrating a structure of a delivery control device according to an embodiment of the present disclosure. As illustrated in FIG. 7, the delivery control device is configured to carry out the above delivery method, and includes a user location information acquisition module 1, a delivery apparatus selection module 2 and a delivery apparatus control module 3.

The user location information acquisition module 1 is configured to acquire request information sent by a user, the request information including user location information which indicates a current position of the user.

The delivery apparatus selection module 2 is configured to select a delivery apparatus for the user among at least two types of delivery apparatuses according to the user location information.

The delivery apparatus control module 3 is configured to control the selected delivery apparatus to deliver an article and/or service to the user.

The user location information acquisition module 1 may be configured to perform the step S1 of the delivery method described above, the delivery apparatus selection module 2 may be configured to perform the step S2 of the delivery method described above, and the delivery apparatus control module 3 may be configured to perform the step S3 of the delivery method described above. Detailed description of the functions of the three modules may refer to the above description for the steps S1 to S3 in the above delivery method, and will be omitted here.

Optionally, the at least two types of delivery apparatuses include robots and UAVs.

Figure 8:
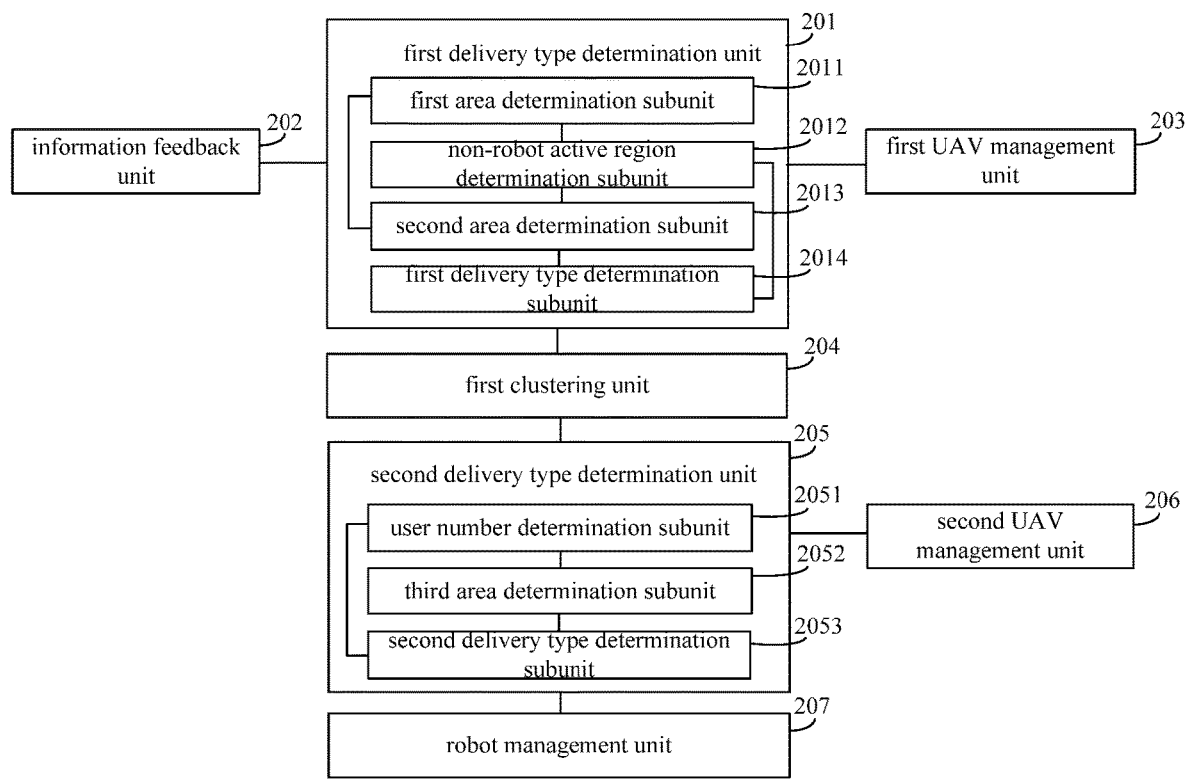
FIG. 8 is a schematic diagram illustrating a structure of the delivery apparatus selection module 2 shown in FIG. 7.

FIG. 8 is a schematic diagram illustrating a structure of the delivery apparatus selection module 2 shown in FIG. 7. As illustrated in FIG. 8, optionally, the delivery apparatus selection module 2 includes a first delivery type determination unit 201, an information feedback unit 202, and a first UAV management unit 203.

The first delivery type determination unit 201 is configured to determine whether a first delivery type for the user is UAV delivery, provisional robot delivery or unable to deliver according to the user location information, respective location information of the robots in the idle state or the task execution state, and respective location information of the UAVs in the idle state.

The information feedback unit 202 is configured to return information for indicating a delivery request being failed to the user in a case where the first delivery type is determined to be unable to deliver.

The first UAV management unit 203 is configured to determine an identifier of a UAV in the idle state and closest to the user, and switch a state of the UAV having the determined identifier to the task execution state, in a case where the first delivery type determination unit 201 determines the first delivery type to be UAV delivery.

Specifically, the delivery apparatus control module 3 is configured to control the UAV having the determined identifier to deliver an article to the user when the first UAV management unit 203 has switched a state of the UAV having the determined identifier to the task execution state.

The first delivery type determination unit 201 may be configured to perform the step S201 of the delivery method described above, the information feedback unit 202 may be configured to perform the step S202 of the delivery method described above, and the first UAV management unit 203 may be configured to perform the step S203 of the delivery method described above. Detailed description of the functions of the three units may refer to the above description for the steps S201 to S203 in the above delivery method, and will be omitted here.

In one example, the first delivery type determination unit 201 includes a first area determination subunit 2011, a non-robot active region determination subunit 2012, a second area determination subunit 2013, and a first delivery type determination subunit 2014.

The first area determination subunit 2011 is configured to determine whether there is any robot in the idle state or the task execution state within a first area where the user is located. In one example, the first area is an area encircled by a circle, a circular center of which is the position of the user and a radius of which is a first predetermined distance.

The non-robot active region determination subunit 2012 is configured to determine whether or not the user is located within a non-robot active region according to the user location information, in a case where it is determined by the first area determination subunit 2011 that there is a robot in the idle state or the task execution state within the first area.

The second area determination subunit 2013 is configured to determine whether there is any UAV in the idle state within a second area where the user is located, in a case where the first area determination subunit 2011 determines that there is no robot in the idle state or the task execution state within the first area and in a case where the non-robot active region determination subunit 2012 determines that the user is located within the non-robot active region. In one example, the second area is an area encircled by a circle, a circular center of which is the position of the user and a radius of which is a second predetermined distance.

The first delivery type determination subunit 2014 is configured to determine the first delivery type for the user to be provisional robot delivery in a case where the non-robot active region determination subunit 2012 determines that the user is not located within the non-robot active region, determine the first delivery type for the user to be UAV delivery in a case where the second area determination subunit 2013 determines that there is a UAV in the idle state within the second area, and determine the first delivery type for the user to be unable to deliver in a case where the second area determination subunit 2013 determines that there is no UAV in the idle state within the second area.

It should be noted that the first area determination subunit 2011 may be configured to perform the step S2011 of the delivery method described above, the non-robot active region determination subunit 2012 may be configured to perform the step S2012 of the delivery method described above, and the second area determination subunit 2013 may be configured to perform the step S2013 of the delivery method described above. Detailed description of the functions of the three subunits may refer to the above description for the steps S2011 to S2013 in the above delivery method, and will be omitted here.

Optionally, the delivery apparatus selection module 2 further includes a first clustering unit 204, a second delivery type determination unit 205, a second UAV management unit 206, and a robot management unit 207.

The first clustering unit 204 is configured to acquire the user location information for all users for which the first delivery type is determined to be provisional robot delivery within a first period of time, and perform a clustering process on the acquired user location information to obtain one or more first cluster area(s) and location information of respective first cluster center(s) of the one or more first cluster area(s).

The second delivery type determination unit 205 is configured to determine for each first cluster center whether a second delivery type for the first cluster center is UAV delivery or robot delivery according to the location information of the first cluster center and the number of users within the first cluster area corresponding to the first cluster center.

The second UAV management unit 206 is configured to determine, for each first cluster center, an identifier of a UAV in the idle state and closest to the first cluster center when the second delivery type determination unit 205 determines the second delivery type for the first cluster center to be UAV delivery, and switch a state of the UAV having the determined identifier to the task execution state.

The robot management unit 207 is configured to calculate, for each first cluster center, delivery costs of robots in the idle state and robots in the task execution state when the second delivery type determination unit 205 determines the second delivery type for the first cluster center to be robot delivery, determine an identifier of a robot having the lowest delivery cost, and switch a state of the robot having the determined identifier to the task execution state. The delivery cost for a first cluster center is associated with a distance from a robot to the first cluster center. In a case where a robot is in the idle state, the delivery cost of the robot for a first cluster center is equal to a distance from the robot to the first cluster center. In a case where the robot is in the task execution state, a direction from the robot towards a target position for a task being executed by the robot is a first direction, and a direction from the robot towards the first cluster center is a second direction. In a case where an angle between the first direction and the second direction is less than or equal to an angle threshold, the delivery cost of the robot for a first cluster center is equal to a distance from the robot to the first cluster center. In a case where the angle between the first direction and the second direction is larger than the angle threshold, the delivery cost of the robot for a first cluster center is equal to a sum of a distance from the robot to the target position of the task being executed by the robot and a distance from the target position to the first cluster center.

Specifically, the delivery apparatus control module 3 is configured to control the UAV having the determined identifier to deliver an article to the first cluster center when the second UAV management unit 206 has switched a state of the UAV having the determined identifier to the task execution state.

Specifically, the delivery apparatus control module 3 is configured to control the robot having the determined identifier to deliver an article to the first cluster center when the robot management unit 207 has switched a state of the robot having the determined identifier to the task execution state.

It should be noted that the first clustering unit 204 may be configured to perform the step S204 of the delivery method described above, the second delivery type determination unit 205 may be configured to perform the step S205 of the delivery method described above, the second UAV management unit 206 may be configured to perform the step S206 of the delivery method described above, and the robot management unit 207 may be configured to perform the steps S207 and S208 of the delivery method described above. Detailed description of the functions of the four units may refer to the above description for the steps S205 to S208 in the above delivery method, and will be omitted here.

Optionally, the second delivery type determination unit 205 includes a user number determination subunit 2051, a third area determination subunit 2052, and a second delivery type determination subunit 2053.

The user number determination subunit 2051 is configured to determine for each first cluster center whether or not the number of users within the first cluster area corresponding to the first cluster center is less than a threshold number of users.

The third area determination subunit 2052 is configured to determine whether there is any robot in the idle state or the task execution state within a third area in which the first cluster center is located, in a case where the user number determination subunit 2051 determines that the number of users is less than the threshold number of users. In one example, the third area is an area encircled by a circle, a circular center of which is the first cluster center and a radius of which is a third predetermined distance.

The second delivery type determination subunit 2053 is configured to determine the second delivery type for the first cluster center to be robot delivery in a case where the user number determination subunit 2051 determines that the number of users within the first cluster area corresponding to the first cluster center is larger than or equal to the threshold number of users, determine the second delivery type for the first cluster center to be robot delivery in a case where the third area determination subunit 2052 determines that there is a robot in the idle state or the task execution state within the third area, and determine the second delivery type for the first cluster center to be UAV delivery in a case where the third area determination subunit 2052 determines that there is no robot in the idle state or the task execution state within the third area.

It should be noted that the user number determination subunit 2051 may be configured to perform the step S2051 of the delivery method described above, and the third area determination subunit 2052 may be configured to perform the step S2052 of the delivery method described above. Detailed description of the functions of the two subunits may refer to the above description for the steps S2051 and S2052 in the above delivery method, and will be omitted here.

In one example, the delivery control device further includes a person location information processing module 4, a distance calculation module 5, a minimum distance value determination module 6, an optimization distribution control module 7, a data removing module 8, and a set judgment module 9.

The person location information processing module 4 is configured to acquire location information for all persons within a first region, and perform a clustering process on the acquired location information for all the persons within the first region to obtain one or more second cluster area(s) and location information of respective second cluster center(s) of the one or more second cluster area(s), all second cluster center(s) constituting a first set and all robots in the idle state constituting a second set.

The distance calculation module 5 is configured to calculate, for each second cluster center in the first set, distances from the second cluster center to respective robots in the idle state in the second set.

The minimum distance value determination module 6 is configured to select the minimum distance among the distances calculated by the distance calculation module 5, and determine the second cluster center and the robot by which the minimum distance is calculated.

The optimization distribution control module 7 is configured to control the robot corresponding to the minimum distance to move towards the second cluster center corresponding to the minimum distance, and switch a state of the robot corresponding to the minimum distance from the idle state to an optimizing distribution state.

The data removing module 8 is configured to remove the second cluster center corresponding to the minimum distance from the first set, and remove the robot corresponding to the minimum distance from the second set.

The set judgment module 9 is configured to determine whether or not each of the first set and the second set is an empty set, and control the distance calculation module 5 to perform calculation again in a case where none of the first set and the second set is determined to be an empty set.

It should be noted that the person location information processing module 4 may be configured to perform the step S4 of the delivery method described above, the distance calculation module 5 may be configured to perform the step S5 of the delivery method described above, the minimum distance value determination module 6 may be configured to perform the step S6 of the delivery method described above, the optimization distribution control module 7 may be configured to perform the step S7 of the delivery method described above, the data removing module 8 may be configured to perform the step S8 of the delivery method described above, and the set judgment module 9 may be configured to perform the step S9 of the delivery method described above. Detailed description of the functions of the six modules may refer to the above description for the steps S4 to S9 in the above delivery method, and will be omitted here.

In one example, the delivery control device further includes a battery power determination module 10 and a charging control module 11.

The battery power determination module 10 is configured to determine whether or not a battery power of each of the robots in the idle state is less than a battery power threshold.

The charging control module 11 is configured to control the robot of which the battery power is less than the battery power threshold to move to a predetermined charging station to charge itself in a case where the battery power determination module 10 determines that the battery power of the robot is less than the battery power threshold, and switch a state of the robot of which the battery power is less than the battery power threshold to the charging state.

It should be noted that the battery power determination module 10 may be configured to perform the step S10 of the delivery method described above, and the charging control module 11 may be configured to perform the step S11 of the delivery method described above. Detailed description of the functions of the two modules may refer to the above description for the steps S10 and S11 in the above delivery method, and will be omitted here.

In addition, the delivery apparatus control module 3 may be further configured to perform the steps S301 to S303 in the above delivery method, and detailed description thereof may refer to the above description.

The delivery control device according to the present disclosure not only provides users with self-service or articles anytime and anywhere, but also effectively improves the user experience by optimizing the distribution. Further, providing the charging station may effectively keep the robot operating automatically and continuously.

It should be noted that the delivery control device may be implemented as a storage device and one or more processor (s) coupled with each other, wherein the storage device stores computer-executable instructions, which when executed by the one or more processors, cause the one or more processor(s) to perform the steps of the delivery method according to the present disclosure. For example, the computer-executable instructions may cause the one or more processor(s) to realize functions of one or more of the user location information acquisition module 1, the delivery apparatus selection module 2, the delivery apparatus control module 3, the person location information processing module 4, the distance calculation module 5, the minimum distance value determination module 6, the optimization distribution control module 7, the data removing module 8, and a set judgment module 9. The functions of the modules implemented by the computer-executable instructions may be combined arbitrarily as long as they are not mutually exclusive or contradictory.

Examples of an appropriate storage device include, but are not limited to, a magnetic disk or a tape, an optical storage medium such as compact disks (CDs) or DVDs (digital versatile disks), a flash memory, and any other non-transitory storage medium. Optionally, the storage device is a non-transitory memory.

Needless to say, the delivery control device according to the present disclosure is not limited thereto, and may be implemented in other form of a combination of software and hardware.

In another aspect, the present disclosure may further provide a delivery system including the above-described delivery control device, delivery apparatuses such as a UAV and a robot, a portable terminal for sending request information and the like which communicate with each other via a communication network such as the Internet or a wireless network.

In the delivery method and the delivery control device according to the present disclosure, a self-service or an article is provided to a user by acquiring position information of a user who needs the self-service or the article and selecting a corresponding UAV or robot to move to the position where the user is located or close to. The delivery method breaks the restriction in the prior art that the self-service apparatus is at a fixed location that cannot be adjusted, so that the user can conveniently use self-service or required articles anywhere, thereby improving the user experience.

It can be understood that the foregoing implementations are merely exemplary implementations used for describing the principle of the present disclosure, but the present disclosure is not limited thereto. Those ordinary skilled in the art may make various variations and improvements without departing from the spirit and essence of the present disclosure, and these variations and improvements shall fall into the protection scope of the present disclosure.

What is claimed is:

1. A delivery control device, comprising:
a storage device; and
one or more processor coupled to the storage device,
wherein the storage device is configured to store computer-executable instructions, which when executed by the one or more processors, cause the one or more processors to perform operations of:
acquiring request information sent by a user, the request information comprising user location information which indicates a current position of the user,
selecting, according to the user location information, a delivery apparatus for the user among at least two different categories of delivery apparatuses, wherein the delivery apparatuses comprise robots and unmanned aerial vehicles (UAVs),
determining whether a delivery status for the user is UAV delivery, robot delivery or unable to deliver according to the user location information, a location and a state of a robot, and a location and a state of a UAV, and determining an identifier of a delivery apparatus for delivering at least one of an article and service to the user among the delivery apparatuses, and
controlling the selected delivery apparatus having the determined identifier to deliver the at least one of the article and service to the user based on the determined delivery status.

2. The delivery control device according to claim 1, wherein the state of a robot comprises an idle state and a task execution state, the state of a UAV comprises an idle state and a task execution state, and
the storage device is further configured to perform operations of:
determining whether a first delivery status for the user is UAV delivery, provisional robot delivery or unable to deliver according to the user location information, respective location information of robots in the idle state or the task execution state, and respective location information of UAVs in the idle state;
in a case where the first delivery status is determined to be unable to deliver, returning information for indicating a delivery request being failed to the user; and in a case where the first delivery status is determined to be UAV delivery, determining an identifier of a UAV in the idle state and closest to the user, switching a state of the UAV having the determined identifier to the task execution state, and controlling the UAV having the determined identifier to deliver the at least one of an article and service to the user.

3. The delivery control device according to claim 2, wherein the storage device is further configured to perform operations of:

determining whether there is any robot in the idle state or the task execution state within a first area where the user is located;

in a case where a result of the determining whether there is any robot in the idle state or the task execution state within a first area where the user is located is that there is a robot in the idle state or the task execution state within the first area, determining whether or not the user is located within a non-robot active region according to the user location information;

in a case where the result of the determining whether there is any robot in the idle state or the task execution state within the first area where the user is located is that there is no robot in the idle state or the task execution state within the first area or in a case where a result of the determining whether or not the user is located within the non-robot active region is that the user is located within the non-robot active region, determining whether there is any UAV in the idle state within a second area that is an area encircled by a circle, a circular center of which is a position of the user and a radius of which is a second distance;

in a case where the result of the determining whether or not the user is located within a non-robot active region is that the user is not located within the non-robot active region, determining the first delivery status for the user to be provisional robot delivery;

in a case where a result of the determining whether there is any UAV in the idle state within the second area is that there is a UAV in the idle state within the second area, determining the first delivery status to be UAV delivery; and in a case where the result of the determining whether there is any UAV in the idle state within the second area is that there is no UAV in the idle state within the second area, determining the first delivery status to be unable to deliver.

4. The delivery control device according to claim 2, wherein the storage device is further configured to perform operations of:

acquiring the user location information for all users for which the first delivery status is determined to be provisional robot delivery within a first period of time, and performing a clustering process on the acquired user location information to obtain one or more first cluster areas and location information of respective first cluster centers of the one or more first cluster areas;

determining, for each first cluster center, whether a second delivery status for the first cluster center is UAV delivery or robot delivery according to the location information of the first cluster center and the number of users within the first cluster area corresponding to the first cluster center;

in a case where the second delivery status for the first cluster center is determined to be UAV delivery, determining an identifier of a UAV in the idle state and closest to the first cluster center, and switching the state of the UAV having the determined identifier to the task execution state;

in a case where the second delivery status for the first cluster center is determined to be robot delivery, calculating delivery costs of robots in the idle state and robots in the task execution state, the delivery cost for the first cluster center being associated with a distance from a robot to the first cluster center, determining an identifier of a robot having the lowest delivery cost, and switching the state of the robot having the determined identifier to the task execution state;

after the state of the UAV having the determined identifier is switched to the task execution state, controlling the UAV having the determined identifier to deliver the at least one of an article and service to the first cluster center; and after the state of the robot having the determined identifier is switched to the task execution state, controlling the robot having the determined identifier to deliver the at least one of an article and service to the first cluster center.

5. The delivery control device according to claim 4, the storage device is further configured to perform operations of:

determining whether or not a number of users within the first cluster area corresponding to the first cluster center is less than a threshold number of users;

in a case where the number of users within the first cluster area corresponding to the first cluster center is determined to be less than the threshold number of users, determining whether there is any robot in the idle state or the task execution state within a third area in which the first cluster center is located;

in a case where the number of users within the first cluster area corresponding to the first cluster center is determined to be larger than or equal to the threshold number of users, determining the second delivery status to be robot delivery;

in a case where a result of the determining whether there is any robot in the idle state or the task execution state within the third area is that there is a robot in the idle state or the task execution state within the third area, determining the second delivery status for the first cluster center to be robot delivery; and in a case where the result of the determining whether there is any robot in the idle state or the task execution state within the third area is that there is no robot in the idle state or the task execution state within the third area, determining the second delivery status for the first cluster center to be UAV delivery.

* * * * *